P. W. MILBURN.
VALVE FOR INTERNAL COMBUSTION ENGINE CYLINDERS.
APPLICATION FILED OCT. 11, 1912.

1,102,283.

Patented July 7, 1914.

2 SHEETS—SHEET 1.

WITNESSES

INVENTOR
Paul W. Milburn

P. W. MILBURN.
VALVE FOR INTERNAL COMBUSTION ENGINE CYLINDERS.
APPLICATION FILED OCT. 11, 1912.

1,102,283.

Patented July 7, 1914.
2 SHEETS—SHEET 2.

UNITED STATES PATENT OFFICE.

PAUL W. MILBURN, OF SPOKANE, WASHINGTON.

VALVE FOR INTERNAL-COMBUSTION-ENGINE CYLINDERS.

1,102,283.

Specification of Letters Patent.   Patented July 7, 1914.

Application filed October 11, 1912. Serial No. 725,236.

*To all whom it may concern:*

Be it known that I, PAUL W. MILBURN, a citizen of the United States, residing at Spokane, county of Spokane, and State of Washington, have invented new and useful Improvements in Valves for Internal-Combustion-Engine Cylinders, of which the following is a specification.

This invention relates to valves for internal combustion engines of the four cycle type, and more particularly to positively driven valves of the rotary type.

It is the object of this invention to provide a valve which will operate to open and close a port in the engine cylinder rapidly and noiselessly, and at the same time remain open long enough to permit of a free passage of the combustible charge to, and the exhaust gases from said cylinder.

Figure 1:
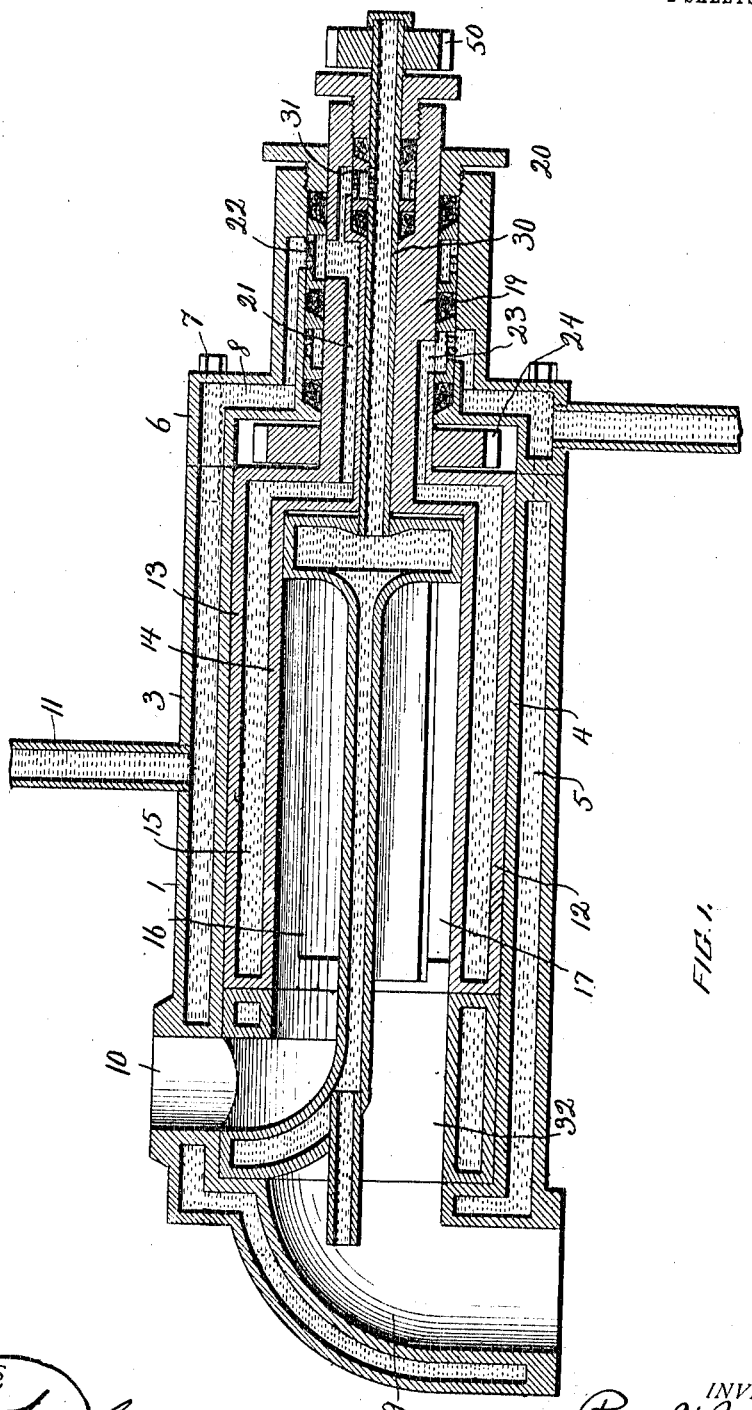
Figure 4:
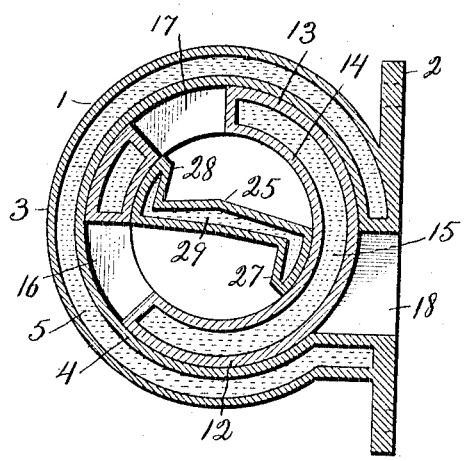
Figure 5:
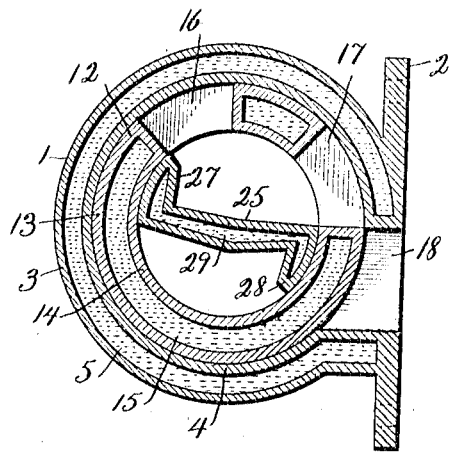
Figure 2:
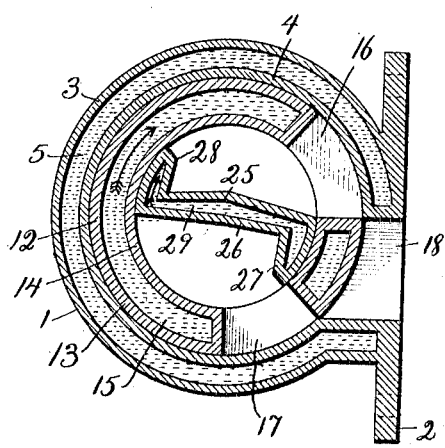
Figure 3:
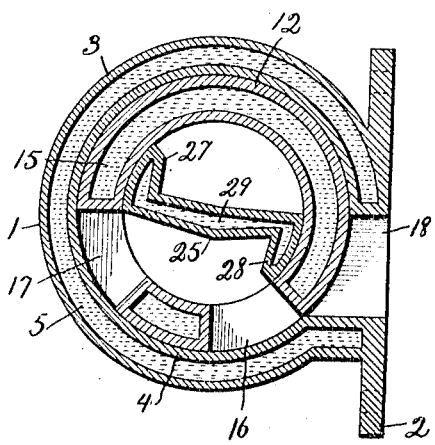

In the drawings, Figure 1, is a longitudinal sectional view of the invention showing the arrangement of the valves and the means for driving the same. Fig. 2, is a transverse sectional view taken through the valve casing and showing the position of the several parts just prior to the opening of the intake port and on the first or intake stroke of the cycle of the piston. Fig. 3, is a transverse sectional view taken through the valve casing and showing the position of the several parts at the time of closing of the intake port, and at a time when the piston is starting to return on the second or compression stroke of the cycle. Fig. 4, is a transverse sectional view of the valve casing and valve showing the port of the cylinder closed and at a time after the charge has been fired and the piston has started on the third or power stroke of the cycle. Fig. 5, is a transverse sectional view taken through the valve and casing showing the position of the several parts at a time just prior to the opening of the cylinder port for the exhaust of the burnt gases, and at a time when the piston is just starting the fourth or exhaust stroke of the cycle.

Referring more particularly to the drawings the numeral —1— designates the valve casing which is secured to the engine cylinder by means of bolts or the like which pass through the wings —2—. The valve casing —1— is cylindrical in form and comprises two walls —3— and —4— spaced to form a water jacket —5— for the circulation of water to cool the casing and interior working parts of the valve. This valve casing —1— is closed at one extremity by means of a header or the like —6—, secured in place by bolts or screws —7— shown in Fig. 1. This header section is also formed with spaced walls to provide a space —8— for the circulation of water, and has its free extremity open as shown in Fig. 1. The opposite extremity of the casing is provided with a curved passage —9— which serves as the exhaust passage from the interior of the valve.

The inlet port —10— is located at the top of the casing, extending entirely across the casing, and passes through the same to the interior thereof. About midway of the casing is located the water inlet —11— which communicates with the chamber —5— and supplies water thereto for the purpose of cooling.

Rotatably mounted within the valve casing —1—, is a sleeve —12— which is tapered from one extremity to the other, and consists of two spaced walls —13— and —14—, the space —15— between said walls —13— and —14— serving as a chamber for the circulation of water. The sleeve —12— is provided with two ports —16— and —17—, the port —16— of which is the inlet port, and the port —17— is the exhaust port. These ports are alternately brought into register with the port —18— of the valve casing which latter port is at all times in register with a port through the wall of the engine cylinder, which is not shown in the drawings herewith. The sleeve —12— is rotated at one-half engine speed, and this together with the location of the ports serves to bring the inlet port —16— of the sleeve —12— into register with the port —18— of the casing —1— almost immediately after the exhaust port —17— has passed out of register with the port —18— of the casing —1—.

The sleeve —12— has an integral spindle —19— which projects through the open extremity of the casing —1— afore mentioned, and is held in place by a suitable gland or the like —20—. The spindle —19— is also provided with a passage —21— which communicates by means of passage —22— with the water chamber —5— of the casing —1—. This passage —21— is also in communication with the water chamber —15— of the body portion of the sleeve —12—. The water chamber —15— of the sleeve is also in communication with passage —23— leading to the water outlet on the under side of header —6—. Suitably secured to the spindle —19— is a gear —24— which is connected in any suitable means with the crank shaft of the engine and forms the means by which the sleeve is rotated.

Rotating within the sleeve —12— is a member —25—, which is tapered from one extremity to the other, and which comprises a body portion —26— from which project on opposite sides wings —27— and —28—. The member —25— serves to divide the interior of the sleeve —12— into an inlet chamber and an exhaust chamber, the wing —27— being located on the exhaust side of the member —25— and the wing —28— being located on the inlet side of the member —25—. This member —25— is also provided with an inner chamber —29— for the circulation of water to cool the same. Extending from the member —25— is a spindle —30— which is freely revoluble within the afore mentioned spindle —19— of the sleeve —12—. The inner chamber —29— of the member —25— also extends throughout the spindle —30— and communicates with the water space —5— of the casing —1— by means of a passage —31— leading to the passage —21— of the stem —19—. Extending from the opposite extremity of the member —25— is an outlet pipe —32— which empties directly into the exhaust passage —9— as shown in Fig. 1, and serves as the water outlet of member —25—. Secured to the free extremity of the spindle —30— is a gear —50— which has a suitable driving connection with the crankshaft of the engine and is the means by which said inner member is rotatively driven.

Water entering the inlet —11— of the casing fills the chamber —5— thereof and then passes through the passage —22— to passages —21— and —31—; through passage —21— to the inner chamber —15— of the sleeve —12— from whence it passes through the passage —23— to the water outlet on the under side of header —6—; and through the passage —31— to the inner chamber —29— of the member —25— and thence out through the outlet pipe —32— into the exhaust pipe —9—. It will thus be seen that a perfect flow of water is provided for through all parts of the valve.

Having fully described my invention, I will now describe the operation thereof. The valve being in the position shown in Fig. 2, the inlet port —16— being about to register with the port —18—, and the piston in the engine cylinder about to descend on the first or intake stroke of the cycle; as the piston descends, the sleeve moves in the direction of the arrow, and opens the port —18— of the casing to the inlet port —10— of the casing, and as the piston farther descends on this stroke of the cycle, it draws in the charge of combustible gas. As soon as the piston has reached the limit of this cycle, and starts to return upon the second or compression stroke, the sleeve —12— has rotated to a point shown in Fig. 3, and the port —18— in the casing has been completely closed. In the meantime due to its increased rotation the member —25— has made one-half a revolution as will be seen from Fig. 3, completely closing inlet port —10—. Upon further rotation of the sleeve —12— and upon the completion of the compression stroke of the piston, the sleeve assumes the position shown in Fig. 4, and it is in this position when the charge is fired and the piston starts down upon its working stroke. At this time the member —25— has made a complete revolution as will be seen in this figure. After the piston has reached the limit of the working stroke, and starts upon its return stroke, the exhaust port —17— of the sleeve —12— begins to register with the port —18— of the casing, and upon the return of the piston the burnt gases are forced out through the exhaust pipe —9— the member —25— having completed one-half of its second revolution, and the exhaust side thereof is in register with the port —18— of the casing.

What is claimed is:—

1. A rotary valve, comprising a casing having a port therein, a sleeve rotating in said casing having a plurality of ports adapted to successively register with the port in the casing, a rotating member within the sleeve dividing the sleeve into a plurality of compartments, and means for continuously driving the sleeve and the dividing member.

2. A rotary valve comprising a casing, a sleeve rotating therein, a longitudinally disposed member dividing the sleeve into a plurality of compartments, and means for continuously rotating said sleeve and dividing member.

3. A rotary valve comprising a casing, having a port therein, a sleeve rotating in said casing having a plurality of ports therein adapted to be brought into and out of register with the port in the casing, a rotating member within the sleeve comprising a longitudinally disposed body portion having oppositely arranged lateral wings on its longitudinal edges adapted to divide the sleeve into two compartments, and means for rotating said sleeve and member.

4. A rotary valve comprising a casing, a sleeve rotatable therein, an integral spindle on the sleeve and projecting through the casing, a gear on said spindle for rotating the sleeve, a longitudinally disposed member dividing the sleeve into a plurality of compartments and rotatable within the sleeve, an integral spindle on said dividing member extending through said spindle on the sleeve and the casing, and a gear on each of said spindles for rotating the sleeve and dividing member, respectively.

5. A rotary valve comprising a casing formed of spaced walls to form a water chamber, having a water inlet pipe, a sleeve rotatable in said casing formed of spaced walls to form a water chamber, the water chamber in the sleeve being connected with the water chamber in the casing, and an outlet pipe connected with said casing.

6. A rotary valve comprising a casing formed of spaced walls to form a water chamber, a water inlet pipe therefor, a sleeve rotatable in said casing formed of spaced walls to form a water chamber, the water chamber in the sleeve being connected with the water chamber in the casing, a rotatable member within the sleeve having a water chamber therein connected with the water chamber in the casing and the sleeve, and an outlet pipe connected with said casing.

7. A rotary valve comprising a casing, a sleeve rotating in said casing at one half engine speed, a member rotating within said sleeve at full engine speed and means for rotating the sleeve and the member within the sleeve.

8. A rotary valve comprising a cylindrical casing having a port therein, a tapered sleeve rotating in said casing having a plurality of ports adapted to successively register with the port in the casing, a tapered rotating member within the sleeve dividing the sleeve into two compartments, and means for continuously driving the sleeve and dividing member.

9. A rotary valve comprising a casing, a detachable header at one end for closing same, and an exhaust passage at the opposite end, a sleeve rotatable in said casing, an integral spindle on the sleeve and projecting through said header, a gear on said spindle for rotating the sleeve, a longitudinally disposed member dividing the sleeve into a plurality of compartments and rotatable within the sleeve, an integral spindle on said dividing member extending through said spindle on the sleeve and the header, and a gear on said latter spindle for rotating same independent of the sleeve.

PAUL W. MILBURN.

Witnesses:
J. L. WHITNEY,
G. P. MULCAHY.